(12) United States Patent
Balasubramanian et al.

(10) Patent No.: US 11,720,090 B2
(45) Date of Patent: Aug. 8, 2023

(54) FAULT TOLERANT BACKPLANE SLOT ASSIGNMENT

(71) Applicant: Rockwell Automation Technologies, Inc., Mayfield Heights, OH (US)

(72) Inventors: Sivaram Balasubramanian, Solon, OH (US); Chandresh Chaudhari, Mayfield Heights, OH (US); Kendal R. Harris, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 176 days.

(21) Appl. No.: 16/953,948

(22) Filed: Nov. 20, 2020

(65) Prior Publication Data
US 2022/0163954 A1   May 26, 2022

(51) Int. Cl.
| | | |
|---|---|---|
| *G05B 23/02* | (2006.01) | |
| *H04L 61/50* | (2022.01) | |
| *G05B 19/4063* | (2006.01) | |

(52) U.S. Cl.
CPC ..... *G05B 23/0213* (2013.01); *G05B 19/4063* (2013.01); *H04L 61/50* (2022.05); *G05B 2219/15119* (2013.01); *G05B 2223/02* (2018.08)

(58) Field of Classification Search
CPC .. H04L 61/50; G05B 23/0213; G05B 2223/02
See application file for complete search history.

(56) References Cited

U.S. PATENT DOCUMENTS

| | | |
|---|---|---|
| 6,738,920 B1 | 5/2004 | Horne |
| 6,823,454 B1 | 11/2004 | Hind et al. |

(Continued)

FOREIGN PATENT DOCUMENTS

| | | |
|---|---|---|
| DE | 19750470 A1 | 6/1999 |
| EP | 2244146 A1 | 10/2010 |

(Continued)

OTHER PUBLICATIONS

IBM Technical Disclosure Bulletin, International Business Machines Corp. (Thornwood); "Addressing Smart Devices by Incrementing and Decrementing the Address Identifier"; US, vol. 30, No. 7; Dated Dec. 1, 1987, p. 179/180.

(Continued)

*Primary Examiner* — Nicholas P Celani
(74) *Attorney, Agent, or Firm* — Boyle Fredrickson, SC

(57) ABSTRACT

A method and system for assigning slot addresses to modules in a fault tolerant industrial control system includes a pair of backplane switches on each base. Each backplane switch is configured to communicate between one backplane and the modules located on the base and to communicate between backplane switches located at adjacent bases. A backplane switch on a bank master base first assigns a base address and slot addresses to itself. The backplane switches on each additional base initiate transmission of a base address request. A base address response, including a base address and slot numbers for the adjacent base, is transmitted after a base has its own address assigned. Each base repeats the process in sequence along the bank, incrementing the base address by one and the slot address by the number of slots on the base and passing the new base and slot addresses along the bank.

19 Claims, 10 Drawing Sheets

(56) References Cited

U.S. PATENT DOCUMENTS

| | | |
|---|---|---|
| 10,162,783 B2 | 12/2018 | Chaudhari et al. |
| 2006/0059325 A1 | 3/2006 | Milne |
| 2009/0228609 A1 | 9/2009 | McFarland |
| 2009/0276508 A1* | 11/2009 | Miyake .................. H04L 61/00 709/245 |
| 2014/0089548 A1 | 3/2014 | Prusia |
| 2015/0046710 A1* | 2/2015 | Clish .................... H04L 9/3273 713/169 |
| 2016/0283427 A1* | 9/2016 | Chaudhari ............ G06F 13/404 |
| 2019/0236313 A1 | 8/2019 | Bush et al. |

FOREIGN PATENT DOCUMENTS

| | | | |
|---|---|---|---|
| EP | 3422631 A1 | 1/2019 | |
| EP | 3518133 A1 * | 7/2019 | ........... G05B 19/048 |

OTHER PUBLICATIONS

Extended European Search Report dated Mar. 7, 2022; Application No./Patent No. 21208191.3-1231—(8) pages.
European Communication Pursuant to Article 94(3) EPC dated Mar. 30, 2023; European Patent Application No. 21 208 191.3—(5) pages.

\* cited by examiner

FAULT TOLERANT BACKPLANE SLOT ASSIGNMENT

BACKGROUND INFORMATION

The subject matter disclosed herein relates to a system and method for assigning logical/slot addresses in a fault tolerant backplane and, more specifically, to an automated process in an industrial controller for detecting modules present in the industrial control system and assigning a logical/slot address to each module.

Industrial controllers, such as programmable logic controllers (PLC's), are specialized electronic computer systems used for the control of industrial processes or machinery, for example, in a factory environment. Industrial controllers differ from conventional computers in a number of ways. Physically, they are constructed to be substantially more robust against shock and damage and to better resist external contaminants and extreme environmental conditions. The processors and operating systems are optimized for real-time control and execute languages allowing ready customization of programs to comport with a variety of different controller applications. Industrial controllers may have a user interface for accessing, controlling and/or monitoring the industrial controller, such as through a locally connected terminal having a keyboard, mouse and display.

As is known to those skilled in the art, industrial controllers are configurable according to the requirements of the controlled machine or process. The industrial controller includes a processor module and various input and output modules. The input modules receive signals from sensors, switches, and other devices providing the operating status of the controlled machine or process. The processor module executes a control program which receives the input signals and generates output signals in response to the operating status of the controlled machine or process. The output signals are delivered from the output modules to actuators, indicators, and other devices to achieve a desired operation of the controlled machine or process. Still other modules, such as a counter module, network module, and the like may be included in the controlled machine or process.

In some applications, it may be desirable to provide increased fault tolerance. Fault tolerance allows the machine or process controlled by the industrial controller to continue operation at the same capacity or potentially at a reduced capacity in the event of a single fault in the system. A common method for improving fault tolerance is to provide redundancy in the control system. With redundant components, a secondary, or backup, module is present and is configured to assume operation in the event a fault occurs in the primary module. A message may be generated to alert a technician about the initial fault such that maintenance may be scheduled at a desirable opportunity. However, operation of the controlled machine or process may continue even in the presence of the single fault by using the redundant component.

In order to receive input signals from and provide output signals to various modules, the processor module must communicate with each module. Typically, a dedicated communication bus, also known as a backplane, is provided between the processor module and each additional module connected to the processor module on a local bank of modules. The backplane is configured to accommodate high-speed and reliable communications between modules. In addition, it may be desirable to make the backplane fault tolerant. As a result, redundant backplanes may be provided such that each module includes two dedicated communication busses. If a fault occurs on one backplane, communication may continue on the other backplane.

As industrial processes grow in complexity, an increasing number of modules are being connected to the industrial controller. The modules are often distributed about a machine or along a process line and may be included on both the local bank of modules and on multiple remote banks of modules. The increasing number of modules and distribution of these modules about the machine require more complex control programs. Further, the distributed modules require communications between the modules and the industrial controller over industrial communication networks and/or over local/remote backplanes.

In order to communicate among the different modules in a local bank or a remote bank, each module requires a logical/slot address on its own local backplane to which data messages can be transmitted. Further, the logical/slot address of each module needs to be different than the addresses of the other modules in the local bank to ensure delivery of a data message to the correct module. Manual configuration of logical/slot addresses of all modules in the industrial control system can be time consuming, in particular, in view of the ever increasing number of modules. Distributed modules may require a technician to move between locations to access each module and to complete a manual configuration. Manual configuration is also prone to human error and may result in one or more modules being assigned an incorrect or a duplicate address.

Thus, it would be desirable to provide an improved method and system for assigning slot addresses to modules in an industrial control system.

BRIEF DESCRIPTION

According to one embodiment of the invention, a method for assigning addresses to a plurality of modules in a fault tolerant industrial control system includes authenticating a connection on at least one backplane between at least one backplane switch on a first base and at least one backplane switch on at least one additional base, and assigning a master base address to the first base when the first base detects a signal indicating the first base is a master base. A base address request is received at the first base from the at least one additional base, and a base address and a slot start address are transmitted from the first base to the at least one additional base responsive to receiving the base address request when the master base address has been assigned to the first base. A slot address request is received from at least one module on the at least one additional base with at least one master module on the master base, and a slot address response is transmitted to the at least one module on the at least one additional base from the at least one master module.

According to another aspect of the invention, the at least one backplane may include a first backplane and a second backplane, the first base may include a first backplane switch and a second backplane switch, and the at least one additional base may include a first backplane switch and a second backplane switch. The first backplane is operatively connected between the first backplane switch on the first base and the first backplane switch on the at least one additional base, and the second backplane is operatively connected between the second backplane switch on the first base and the second backplane switch on the at least one additional base. The step of authenticating the connection on the at least one backplane between the at least one backplane switch on the first base and the at least one backplane switch on the at least one additional base further includes authenticating a first connection on the first backplane between the first backplane switch on the first base and the first backplane switch on the at least one additional base and authenticating a second connection on the second backplane between the second backplane switch on the first base and the second backplane switch on the at least one additional base.

According to still another aspect of the invention, the at least one master module on the master base may include a first master module and a second master module. The step of receiving the slot address request from the at least one module on the at least one additional base with the at least one master module on the master base further includes receiving the slot address request from the at least one module on the at least one additional base with the first master module on the master base and receiving the slot address request from the at least one module on the at least one additional base with the second master module on the master base. The step of transmitting the slot address response to the at least one module on the at least one additional base from the at least one master module further includes transmitting the slot address response to the at least one module on the at least one additional base from the first master module and transmitting the slot address response to the at least one module on the at least one additional base from the second master module.

According to another embodiment of the invention, an industrial control system configured to assign addresses to a plurality of slots includes a master base having a first backplane and a second backplane, a first master backplane switch mounted to the master base and configured to communicate on the first backplane, a second master backplane switch mounted to the master base and configured to communicate on the second backplane, a first master module mounted in a first slot on the master base, and a second master module mounted in a second slot on the master base. The first master module is in communication with the first master backplane switch and with the second master backplane switch, and the second master module is in communication with the first master backplane switch and with the second master backplane switch. The industrial control system also includes at least one additional base having a first backplane and a second backplane, where the first backplane in the at least one additional base is configured to communicate with the first backplane in the master base and the second backplane in the at least one additional base is configured to communicate with the second backplane in the master base. The at least one additional base also includes at least one additional first backplane switch and at least one additional second backplane switch. Each of the at least one additional first backplane switches is mounted to one of the at least one additional bases and is configured to communicate on the first backplane of the corresponding additional base, and each of the at least one additional second backplane switches is mounted to one of the at least one additional bases and is configured to communicate on the second backplane of the corresponding additional base. The industrial control system also includes multiple additional modules, where each of the additional modules is mounted in a slot on one of the at least one additional bases, and each of the additional modules is in communication with the additional first backplane switch and the additional second backplane switch on the corresponding additional base. The first master backplane switch and the at least one additional first backplane switch connected one hop apart are configured to authenticate a connection between the first master backplane switch and the at least one additional first backplane switch, and the second master backplane switch and the at least one additional second backplane switch connected one hop apart are configured to authenticate a connection between the second master backplane switch and the at least one additional second backplane switch. The first master backplane switch transmits a base address and a slot start address to the at least one additional first backplane switch connected one hop apart, and the second master backplane switch transmits the base address and the slot start address to the at least one additional second backplane switch connected one hop apart.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
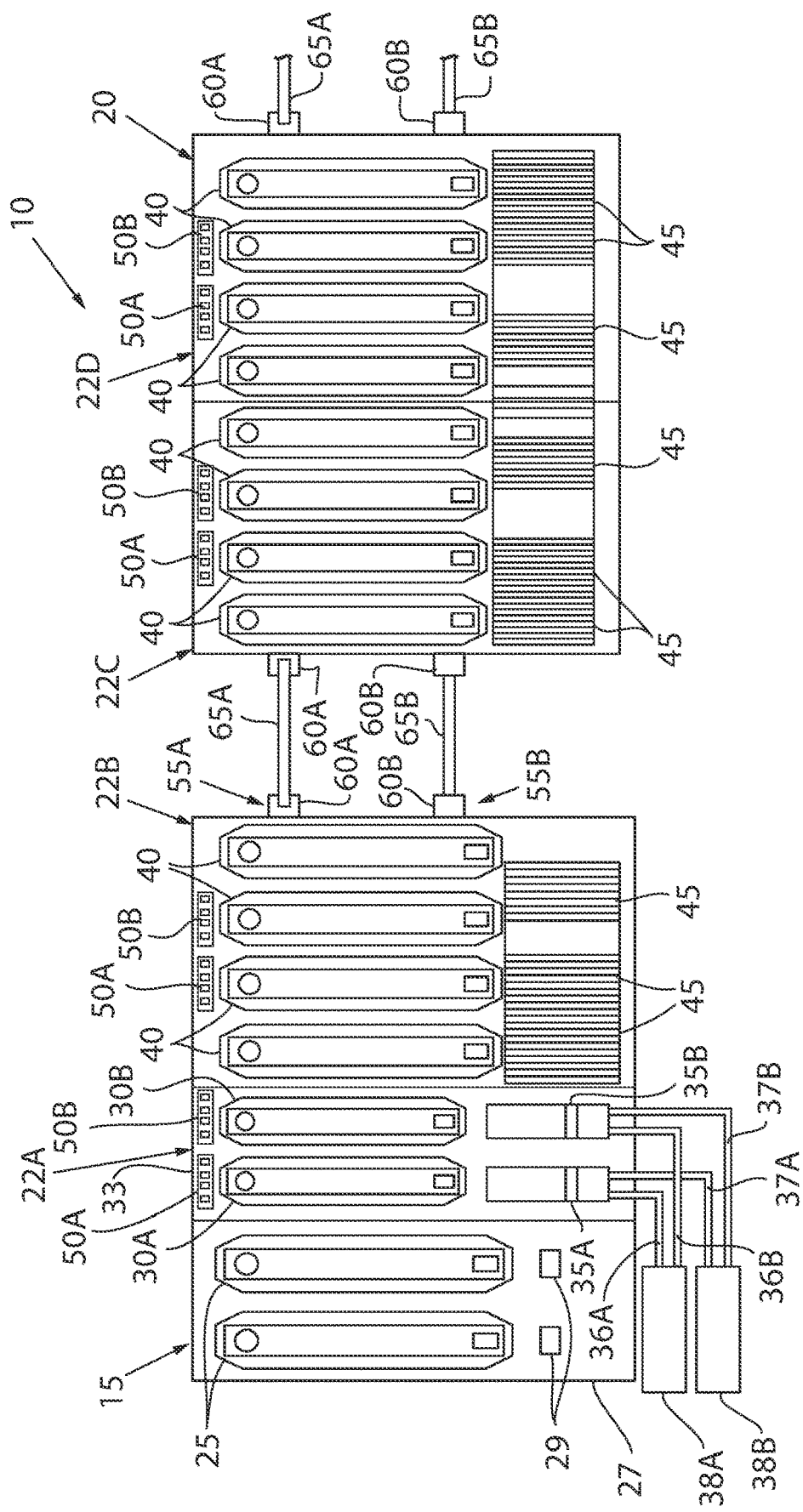
FIG. 1 is a partial front elevation view of an exemplary industrial control system incorporating one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a method and system for assigning slot addresses to modules in a fault tolerant industrial control system. In order to obtain the desired fault tolerance, the industrial control system utilizes redundant components. The industrial control system includes a series of bases connected together via a redundant backplane and/or a redundant industrial network and each base includes redundant modules mounted in slots on the base. Each series of bases forms a bank of modules and a first base, referred to herein as the bank master base, is positioned at one end of the bank of modules. The bank master base may include a pair of controller modules in the case of a controller local bank or a pair of adapter modules in the case of a remote bank. The pair of controller/adapter modules on the bank master base will also be referred to herein as bank master modules. Each base includes a pair of backplane switches, where each backplane switch is configured to communicate between one of the redundant backplanes and the redundant modules located on the base. A first switch in the pair of backplane switches is connected to the first backplane, and a second switch in the pair of backplane switches is connected to the second backplane. According to one aspect of the invention, each backplane is configured as an Ethernet-based backplane. Communication between modules may utilize the physical addresses of each module. If a physical address is not known, communication may occur via a prearranged multicast data packet. During the slot assignment process, the bank master modules generate a table defining physical addresses associated with each logical address in the local bank.

The backplane switches are configured to communicate with each other and with the modules to establish communication between modules on a bank. On power-up, or at a predefined interval, the backplane switches are configured to authenticate connections between modules and/or assign addresses to each base and to each module. As an initial step, the backplane switches are configured to authenticate connections between switches located at adjacent bases within the bank of modules. Once connections between adjacent switches have been authenticated, automatic assignment of base addresses proceeds. Each base may include a hardware signal, such as a pull up/down signal or the like, that may selectively identify the base as the bank master base or the non-master I/O (Input/Output) base. The left-most base, which will include the redundant bank master modules (controllers or adapters), is typically configured with the hardware signal identifying that base as the bank master. The remaining bases are configured as a non-master I/O base. The backplane switches on each base receive the hardware signal from the base. The backplane switches on a base that is identified as the bank master base assign that base to be base number zero and assign each slot on the bank master base a predefined slot address. According to one embodiment of the invention, the predefined slot addresses may be slots one hundred and one hundred one. The backplane switches on each base that are not identified as the bank master initiate transmission of a base address request. The base address request is transmitted from the backplane switch on one base to the backplane switch on the adjacent base. Backplane switches on each base, with the exception of the base most remote from the bank master, will receive a base address request from its immediate neighbor to the right.

A base address response is transmitted by a backplane switch only after the base on which the backplane switches are located has its own base address assigned. Because a base address response is transmitted only after a backplane switch has its own base address assigned, the backplane switches on the bank master are initially the only switches to generate a response. The bank master has been assigned base zero as a result of the hardware signal as explained before. The backplane switches on the bank master increment its base number and transmit a response to the backplane switches on the adjacent base with a base address of zero. In addition, the backplane switches on bank master transmits a slot start address. The backplane switches on bank master start slot addressing at slot zero. The backplane switch on the adjacent base assigns itself base number one as received in the base address response and then assigns each slot on the corresponding base a slot address starting at slot zero as received in the base address response and each slot address being sequentially incremented for the number of slots in the base. If, for example, the base has two slots, it will assign the slots addresses of zero and one. If the base has four slots, it will assign the slots addresses of zero, one, two, and three. The backplane switch on the adjacent base will then increment the base number from its own base address and increment the slot address from the last slot address it was assigned. The backplane switches on the base adjacent to the bank master next transmit the incremented base and slot numbers to subsequent backplane switches on the next adjacent base in a base address response upon reception of a base address request. Each base repeats the process in sequence along the bank, incrementing the base address by one and the slot address by the number of slots on the base and passing the new base and slot addresses along the bank until each backplane switch on a base has received a base address.

Turning initially to FIG. 1, a bank of modules 10 for an industrial control system in accordance with one embodiment of the present invention is illustrated. The bank of modules 10 includes a first segment 15 and a second segment 20. The first segment 15 includes a first set of physical bases (27, 22A, and 22B), and the second segment 20 includes a second set of physical bases (22C, 22D). Each of the physical bases 27, 22A, 22B, 22C, and 22D is configured to be a passive device. Each base includes a plurality of connectors, where each connector is configured to receive an adjacent module, a cable connection, or the like. Electrical connections are established in the interior of each physical base 27, 22A, 22B, 22C, and 22D between various connectors.

The power base 27 is configured to receive a pair of power supply modules 25. A cable (not shown) may plug in to the power supply connector 29 for each of the power supply modules 25. It is contemplated that the power source may be a single-phase alternating current (AC) power supply, such as a 110 VAC power source or a direct current (DC) power supply, such as a 24 VDC power source. Each power supply module 25 receives the input power and supplies the appropriate AC or DC voltages required for the different modules in the industrial control bank. In order to provide fault tolerance, each power supply module 25 is configured such that it may supply the entire power requirements of the industrial control bank in the event one of the two power supply modules 25 should fail. The power base 27 has redundant connectors (not shown) to supply redundant power to downstream bases 22 and through them to different modules in the bank.

The base 22A adjacent to the power base 27 on the first segment 15 is configured to receive a pair of controller modules 30A and 30B, in the case of a controller local bank, or a pair of adapter modules 30A and 30B, in the case of a remote bank, and a pair of network media landing modules 35A and 35B. A second base 22B on the first segment 15 is configured to receive four Input/Output (I/O) modules 40. The pair of controller or adapter modules 30 plugs in to the first base 22A which will also be referred to herein as a bank master physical base. Each controller module 30 is configured to execute a control program where the control program is configured to receive input signals from input modules and to generate output signals for output modules as a function of the input signals. In one embodiment, each controller module 30 may include a copy of the control program and will execute control programs simultaneously after synchronizing and exchanging input signals with each other. They will exchange results of computation at the end of control program execution to generate output signals for output modules. If a failure occurs in one controller module 30, the other controller module will continue execution alone till the other controller is repaired. In another embodiment, each controller module 30 may include a copy of the control program and one controller module is configured as a primary controller 30A and the other controller module is configured as a backup controller 30B. The primary controller 30A may continually update the backup controller 30B with a current operating status of the control program. If a failure occurs in the primary controller 30A, the backup controller 30B takes over control of the industrial control system until the other controller is repaired. It is envisioned that both embodiments will be supported by a single controller module for different parts of control system. The redundant adapter modules 30A and 30B are used in the case of I/O bank of modules located remotely from the controller local bank of modules. Each adapter module is configured to translate control messages received from the controller module 30 on the communication network 38A, 38B to data which may be transmitted to I/O modules 40 on a local backplane 50 for the remote bank of modules and vice versa. In case of a failure of one of the adapter modules, the controller modules will still be able control the system through the functioning adapter module until the failed adapter module is repaired.

The first addressable physical base 22A further includes connectors for a pair of network media landing modules 35. Each network media landing module 35 is configured to be connected to a redundant industrial communication network. Each network media landing module 35, provides a convenient way to plug different network media types such as fiber or copper for network connection at physical layer. The communication messages themselves are sent or received by controller or adapter modules 30 through network media landing modules 35. The industrial communication network may be a special "control network" suitable for highly reliable and available real-time communication. Such control networks (for example, ControlNet®, DeviceNet®, or EtherNet/IP®) differ from standard communication networks (such as Ethernet) by guaranteeing maximum communication delays, by pre-scheduling the communication capacity of the network, and/or providing predefined connections between devices. The first network media landing module 35A includes a first network cable 36A connecting the first network media landing module to a first network 38A and a second network cable 37A connecting the first network media landing module to a second network 38B. Similarly, the second network media landing module 35B includes a first network cable 36B connecting the second network media landing module to a first network 38A and a second network cable 37B connecting the second network media landing module to a second network 38B. All communications may be transmitted over both networks 38A, 38B and data packets received may be compared between networks to ensure that both networks are operating correctly. In the event of a failure in one of the networks 38A, 38B, the other network allows the industrial control system to continue operation.

The second addressable physical base 22B in the first segment 15 includes connectors for multiple I/O modules 40. Because the illustrated control system is a fault tolerant system, it is contemplated that the I/O modules 40 may be configured as pairs of identical modules in one embodiment. In another embodiment, some I/O modules 40 may be configured to operate independently. Although no distinction will be made herein between different types of I/O modules 40, it is contemplated that an I/O module may be any suitable module according to the application requirements. I/O modules 40 may be analog or digital, and the I/O modules may include only inputs, only outputs, or a combination thereof. The I/O modules may be configured to receive or supply DC voltage or AC voltage. Each IO module 40 includes a set of terminals 45, where each set of terminals 45 may also be plugged into a connector on the physical base 22 to which the I/O modules 40 are connected. The terminals 45 are configured to receive wires between the I/O module 40 and devices on the controlled machine or process.

Figure 2:
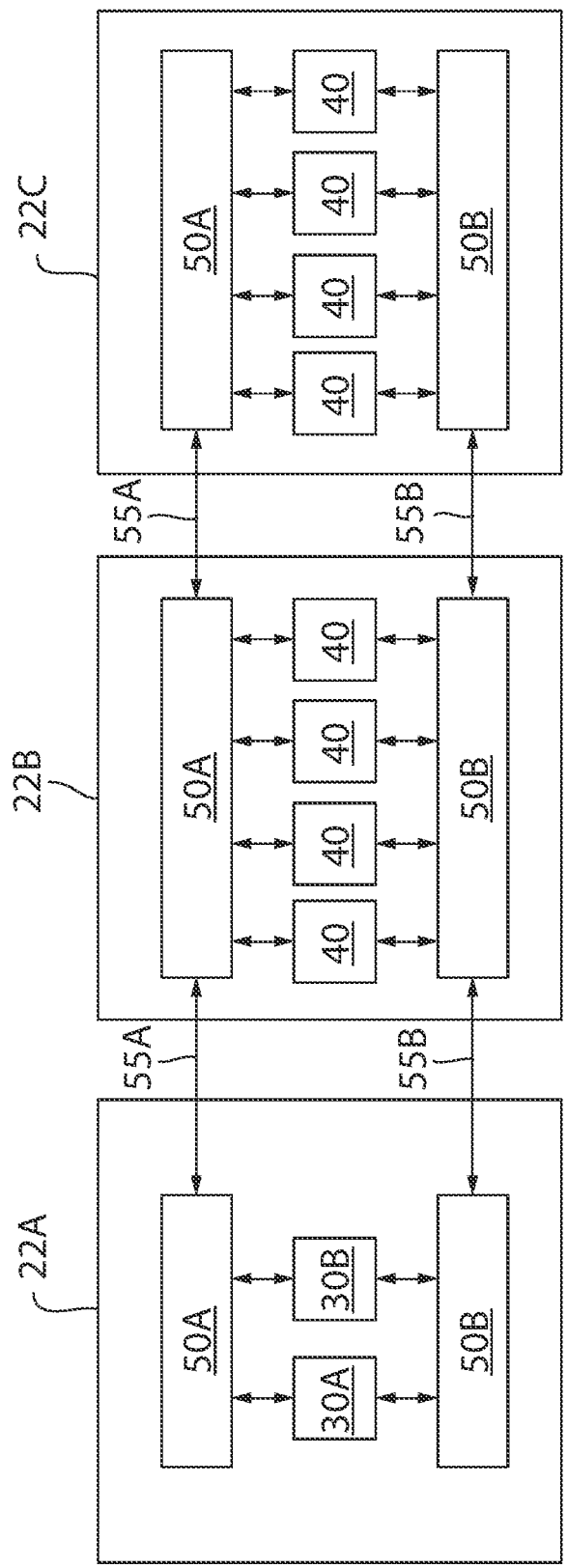
FIG. 2 is a partial block diagram of the exemplary industrial control system shown in FIG. 1.

According to another aspect of the invention, each of the physical bases 22 in the first segment 15 includes a pair of backplane switches 50A, 50B mounted to connectors on the base 22. Each backplane switch 50 is used to facilitate communication between modules on the base 22. Each backplane switch 50 is connected between the modules 30 or 40 on the base 22 and the fault tolerant backplane within the physical base 22. As previously indicated, electrical connections for redundant power and redundant backplanes are established between the physical bases 22 through connectors. Within the physical bases 22, electrical connections for redundant power, redundant backplanes, module connectors and I/O terminals are established through printed circuit board wiring. Similar to the other fault tolerant components, the fault tolerance in the backplane is obtained via redundancy. The fault tolerant backplane includes a first backplane 55A and a second backplane 55B. FIG. 2 shows logical connections between backplane switches, modules and physical bases in FIG. 1. With reference also to FIG. 2, the controller modules 30 and I/O modules 40 are each connected to a pair of switches 50A, 50B. A first switch 50A is connected between the modules 30 or 40 and the first backplane 55A. A second switch 50B is connected between the modules 30 or 40 and the second backplane 55B. The first backplane 55A is connected between pairs of first switches 50A, and the second backplane 55B is connected between pairs of second switches 50B.

With reference again to FIG. 1, the second segment 20 includes two additional physical bases 22C and 22D, each configured to receive multiple I/O modules 40. Because the illustrated control system is a fault tolerant system, it is contemplated that the I/O modules 40 may be configured as pairs of identical modules in one embodiment. In another embodiment, some I/O modules 40 may be configured to operate independently. Similar to the I/O modules 40 on the base 22B in the first segment 15, no distinction will be made herein between different types of I/O modules 40. It is contemplated that an I/O module may be any suitable module according to the application requirements. I/O modules 40 may be analog or digital, and the I/O modules may include only inputs, only outputs, or a combination thereof. The I/O modules may be configured to receive or supply DC voltage or AC voltage. Each IO module 40 includes a set of terminals 45, where each set of terminals 45 may also be plugged into a connector on the second set of physical bases 22A and 22B. The terminals 45 are configured to receive wires between the I/O module 40 and devices on the controlled machine or process.

Similar to the physical bases 22A, 22B on the first segment 15, each of the two additional physical bases 22C, 22D includes pairs of switches 50A, 50B mounted to connectors on the bases 22C, 22D. Each switch 50 is used to facilitate communication between modules 40 on the base 22. Each switch 50 is connected between the I/O modules 40 on the base 22 and the fault tolerant backplane 55 within the physical base 22. As previously indicated, electrical connections for redundant power and redundant backplanes are established between the physical bases 22 through connectors. For bases 22 mounted adjacent to each other the connectors may establish a direct connection between bases. For bases 22 mounted some distance apart from each other, a cable 65 may be connected between the bases 22. Within the physical bases 22, electrical connections for redundant power, redundant backplanes, module connectors and I/O terminals are established through printed circuit board wiring. Similar to the other fault tolerant components, the fault tolerance of the backplane is obtained via redundancy. The fault tolerant backplane includes a first backplane 55A and a second backplane 55B. With reference also to FIG. 2, the I/O modules 40 are each connected to a pair of switches 50A, 50B. A first switch 50A is connected between the I/O modules 40 and the first backplane 55A. A second switch 50B is connected between the I/O modules 40 and the second backplane 55B. The first backplane 55A is connected between pairs of first switches 50A, and the second backplane 55B is connected between pairs of second switches 50B.

Due to physical size limitation of a control cabinet, it may be difficult to fit all bases/modules of a bank in a single row. Hence it is contemplated to allow for multiple segments of a bank so that segments can be arranged in a flexible manner inside a control cabinet. The backplane 55 includes backplane extension modules 60 and backplane cables 65 to connect two segments 15 and 20 of physical bases. The inter-base connectors on the second physical base 22B of the first segment 15 can receive a pluggable first backplane extension module 60A and a pluggable second backplane extension module 60B. Similarly, the inter-base connectors on the first physical base 22C on the second segment 20 can receive a pluggable first backplane extension module 60A and a second pluggable backplane extension module 60B. A first backplane cable 65A extends the first backplane 55A between the two first backplane extension modules 60A, and a second backplane cable 65B extends the second backplane 55B between the two second backplane extension modules 60B. The backplane extension modules 60 and backplane cables 65 join separate physical segments 15 and 20 into a single bank of modules with a common, fault tolerant backplane extending between each of the segments. The backplane cable 65 carries both redundant power and redundant backplane signals between segments. When each backplane is operating normally, each module 30, 40 is able to communicate with any other module along the bank of modules via either backplane 55.

In order to communicate with the other modules connected to the backplane, each module must have an address to which data may be transmitted. Each module 30, 40 in the bank may include a physical address that is assigned during manufacture of modules, such as a Media Access Control (MAC) address, to which a data packet may transmitted. Initially, other modules are unaware of these physical addresses. Further, it would be undesirable for the control program, executing in the controller module 30, to require physical addresses in order to transmit data between modules. Thus, it would be desirable to assign each module 30, 40 a logical address. The logical addresses may be used during development of the control program to define each module 30, 40 within the industrial control system. At power-up the industrial control system initializes the backplane 55 and correlates physical addresses with logical addresses to allow communication between modules 30, 40.

In operation, the backplane switches 50 serve as the primary coordinating device for assigning logical addresses to each of the modules 30, 40. Assigning the addresses is performed generally in three steps. As an initial step, the backplane switches 50 perform authentication between adjacent backplane switches to establish connections along the backplane 55. Similarly, the backplane switches 50 and modules 30, 40 authenticate each other to establish connection on backplane. The backplane switches 50 then initiate a sequence of data packets to request logical addresses for each base and for each slot on the base. Finally, each module 30, 40 can request a slot address from the bank master modules and validate the logical slot number which it has been assigned.

Figure 3:
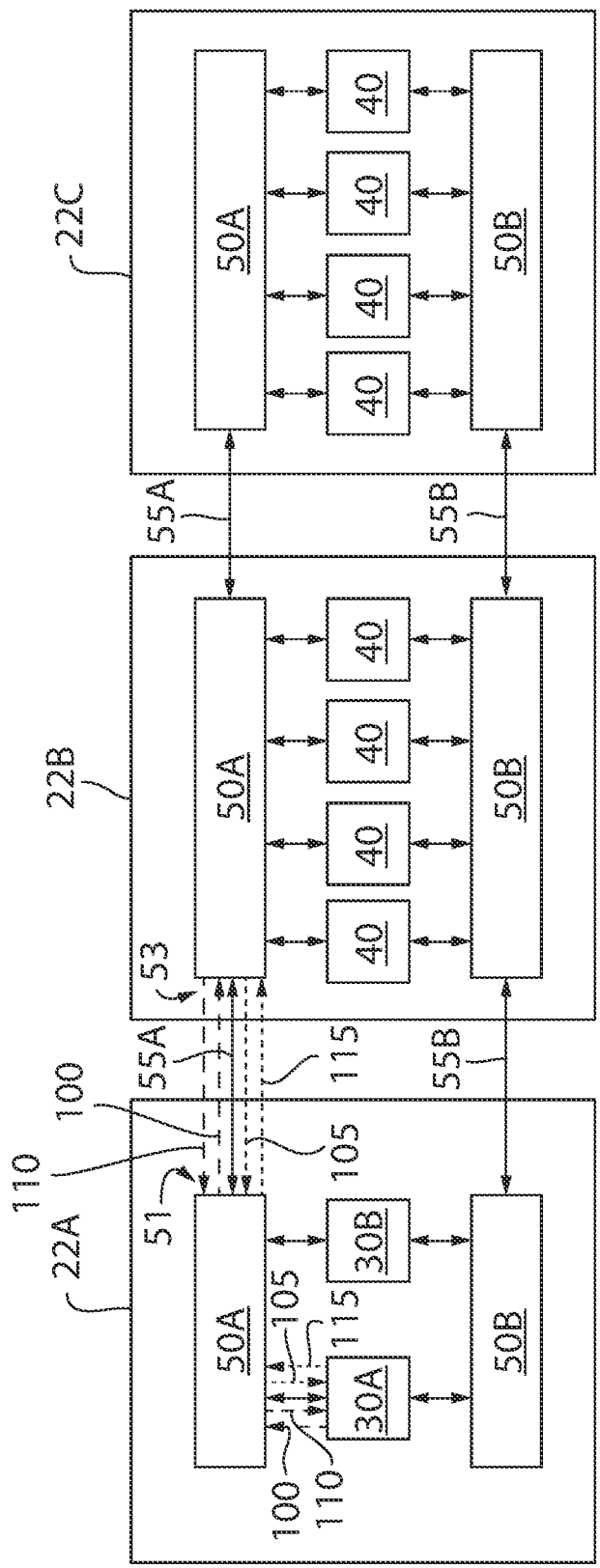
FIG. 3 is a partial block diagram of the exemplary industrial control system shown in FIG. 1 illustrating data flow for authentication.
Figure 4:
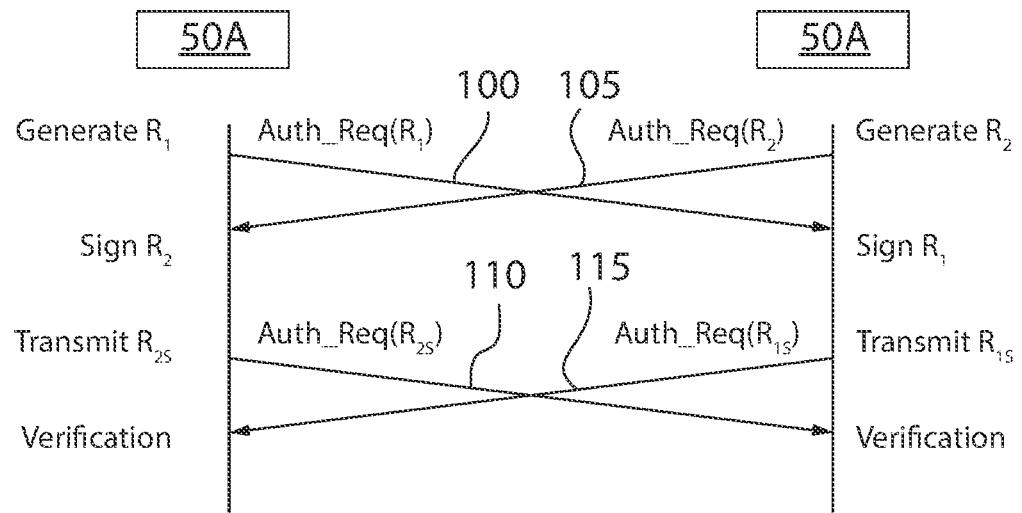
FIG. 4 is a flow diagram illustrating steps for the authentication shown in FIG. 3 according to one embodiment of the invention.

With reference next to FIGS. 3 and 4, a pair of flow diagrams illustrate one embodiment of mutual authentication between backplane switches 50 and each of the modules 30, 40. Authentication verifies that each module or backplane switch communicating on the fault tolerant backplane 55 is an authorized module or backplane switch. Authentication is performed on power-up and may be performed again, for example, if any backplane switch or module is replaced after failure, if a link between any adjacent backplane switches is lost and restored or a link between backplane switch and modules is lost and restored, or on a periodic basis to verify that the modules connected to the backplane 55 remain authorized devices. On power-up or at any time a backplane switch 50 or module 30,40 may be deemed unauthorized as explained above, the unauthorized device is blocked from transmitting data packets to or receiving data packets from the rest of the backplane 55 through the hardware capability of the backplane switch 50 on respective port. The unauthorized device can only communicate with an adjacent backplane switch 50 until it is authenticated.

FIG. 3 shows logical connections between backplane switches 50, modules 30 or 40, and physical bases 22 in FIG. 1 along with data flow for mutual authentication between two adjacent backplane switches 50A and for mutual authentication between a backplane switch 50 and one of the controller modules 30. Though FIG. 3 only illustrates two of the mutual authentication data flow sequences, similar data flow sequences exists between each module 30,40 and backplane switch 50 for mutual authentication. Since the mutual authentication sequence between any two backplane switches is the same as the sequence between a module and backplane switch, the following description explains the process primarily between two backplane switches 50.

For purposes of illustration in FIG. 3, authentication is illustrated between a first backplane switch 50A on the bank master base 22A and a backplane switch 50A on the I/O module base 22B located adjacent to the bank master. Initially, the first switch 50A on the bank master base 22A generates a first random number, $R_1$, and the first switch 50A on the adjacent I/O module base 22B generates a second random number, $R_2$. The first switch 50A on the bank master base 22A then transmits a first authentication request message 100 from a first port 51 on the first switch 50A of the bank master base to another port 53 on the first switch 50A on the I/O module base 22B, and the first switch 50A on the I/O module base 22B transmits a second authentication request message 105 from the other port 53 on the first switch 50A of the I/O module base 22B to the first port 51 on the first switch 50A on the bank master base 22A. The first switch 50A on the bank master base 22A includes the first random number, $R_1$, and a digital vendor certificate that it was assigned during manufacturing in the first authentication request message 100. The first switch 50A on the I/O module base 22B includes the second random number, $R_2$, and a digital vendor certificate that it was assigned during manufacturing in the second authentication request 105.

Because neither of the first switches 50A is aware of the physical address of the other first switch, each switch may generate the respective authentication request as a multicast message. Because each of the first switches 50A has not yet completed authentication, the respective ports 51, 53 are blocked for transmission or reception of messages other than the authentication requests/responses. Each first switch 50A receives the authentication request from the other first switch 50A at their respective port 51, 53. The first switches 50A do not permit the multicast message from being transmitted any further along the backplane.

The first switch 50A on the bank master base 22A receives the second authentication request 105 from the I/O module base 22B, and the first switch 50A on the I/O module base 22B receives the first authentication request 100 from the bank master base 22A. Within each multicast message, the first switch 50A includes the physical address for the switch from which the message is being transmitted. Consequently, the first authentication request 100 includes the physical address of the first switch 50A on the bank master base 22A, and the second authentication request 105 includes the physical address of the first switch 50A on the I/O module base 22B. Each of the first switches 50A extracts the payload from the corresponding authentication request message received at the switch. The payload includes the random number, $R_1$ or $R_2$, and digital vendor certificate from the other first switch. The first switches 50A are also configured to extract the physical address of the first switch from the other physical base 22A, 22B which generated the authentication request message such that the first switch 50A on the bank master base 22A can subsequently use the physical address of the first switch 50A on the I/O module base 22B for a unicast message, and the first switch 50A on the I/O module base 22B can use the physical address of the first switch 50A on the bank master base 22A for a unicast message. The first switch 50A on the bank master base 22A may then use a private key to generate a signed copy of the second random number, $R_{2s}$, and the first switch 50A on the I/O module base 22B may then use a private key to generate a signed copy of the first random number, $R_{1s}$.

After generating the signed copy of the random number, the first switch 50A of the bank master base 22A then generates a first authentication response message 110 in which it includes the signed copy of the second random number, $R_{2s}$. Because the second authentication request message 105 includes the physical address of the first switch 50A on the I/O module base 22B, the first authentication response message 110 may be sent directly to the first switch 50A on the I/O module base 22B using a unicast message. Similarly, the first switch 50A of the I/O module base 22B then generates a second authentication response message 115 in which it includes the signed copy of the first random number, $R_{1s}$. Because the first authentication request message 100 includes the physical address of the first switch 50A of the bank master base 22A, the second authentication response message 115 may be sent directly to the first switch 50A on the bank master base 22A using a unicast message. The authentication response messages 110, 115 are received by the respective backplane switch modules 50A. The first switch 50A on the bank master base 22A then uses a public key on the first signed random number, $R_{1s}$, to verify that the signed random number matches the original random number sent to the first switch 50A on the I/O module base 22B. The first switch 50A on the bank master base 22A also verifies that the digital vendor certificate previously received from the I/O module base 22B is a valid certificate. Similarly, the first switch 50A on the I/O module base 22B uses a public key on the second signed random number, $R_{2s}$, to verify that the signed random number matches the original random number sent to the first switch 50A on bank master 22A. The first switch 50A on the I/O module base 22B also verifies that the digital vendor certificate previously received from the first switch 50A on the bank master base 22A is a valid certificate. When each switch 50A on both bases 22A and 22B has completed the authentication steps and verified that the first switch 50A of one base is communicating with a valid first switch 50A of an adjacent base, the first switches 50A unblock the respective ports 51, 53 allowing normal transmission of messages via each port. The above-described mutual authentication process is performed between each pair of adjacent ports prior to initiating communications. The mutual authentication is performed between adjacent ports on first switches 50A and second switches 50B. Similarly, the mutual authentication is performed between adjacent ports on a switch 50 and a module 30, 40. Once all ports have been authenticated, the switches 50 may begin assigning base and slot addresses.

It is also contemplated that the authentication process described above may occur on a single backplane or between only one module and a switch located on a single base. As previously indicated, the slot assignment process is configured to operate on a fault tolerant system. If, for example, one backplane is faulted, it would be desirable for the other backplane to authenticate and permit operation. Similarly, if one bank master module 30 is faulted, it would be desirable for the other bank master module 30 to authenticate and permit operation. If at least one backplane 55, backplane switch 50, and one module 30 on the bank master 22A successfully authenticates ports to establish communication with the additional bases 22B, 22C, the successful bank master module 30 may assume control of that bank of the industrial control system. A warning and/or fault message may be posted to an operator identifying which backplane 55, backplane switch 50, or bank master module 30 was not successful in authentication, such that a technician may correct, repair, or replace the faulted device at a convenient time.

Figure 5:
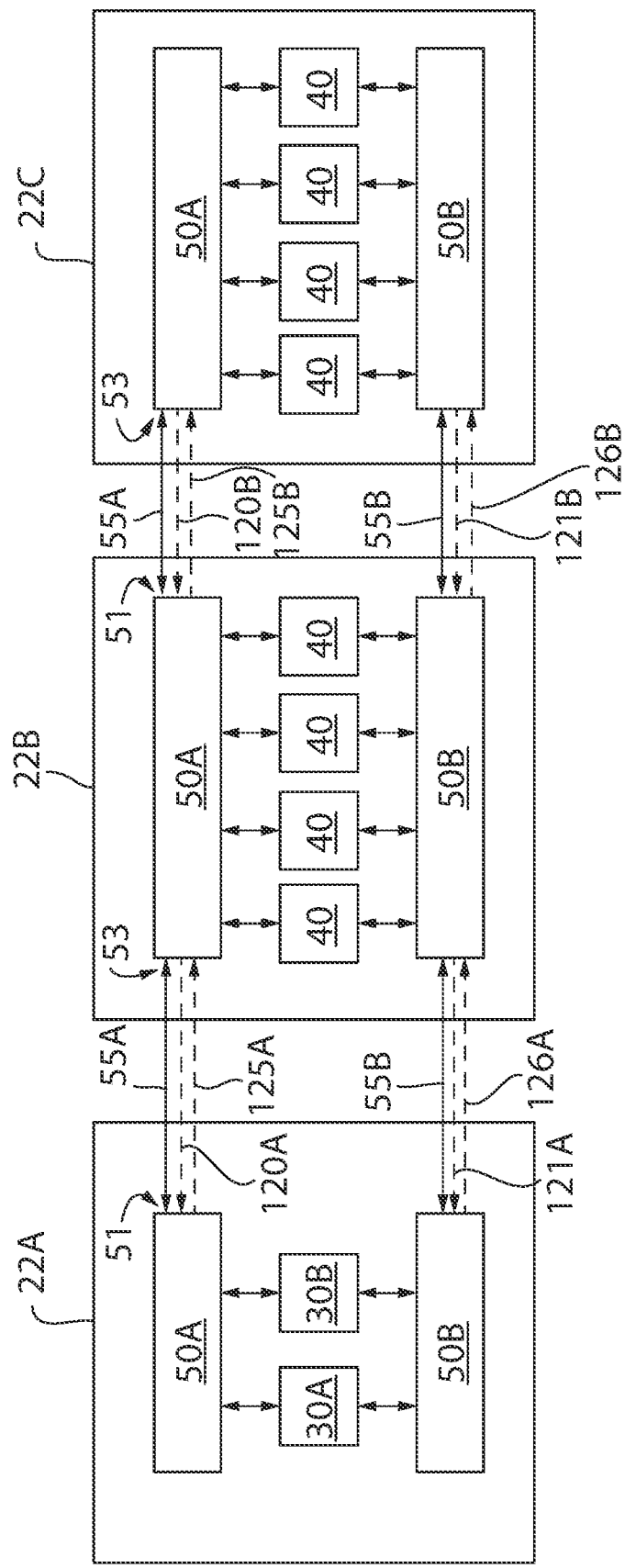
FIG. 5 is a partial block diagram of the exemplary industrial control system shown in FIG. 1 illustrating data flow for assigning base addresses.
Figure 6:
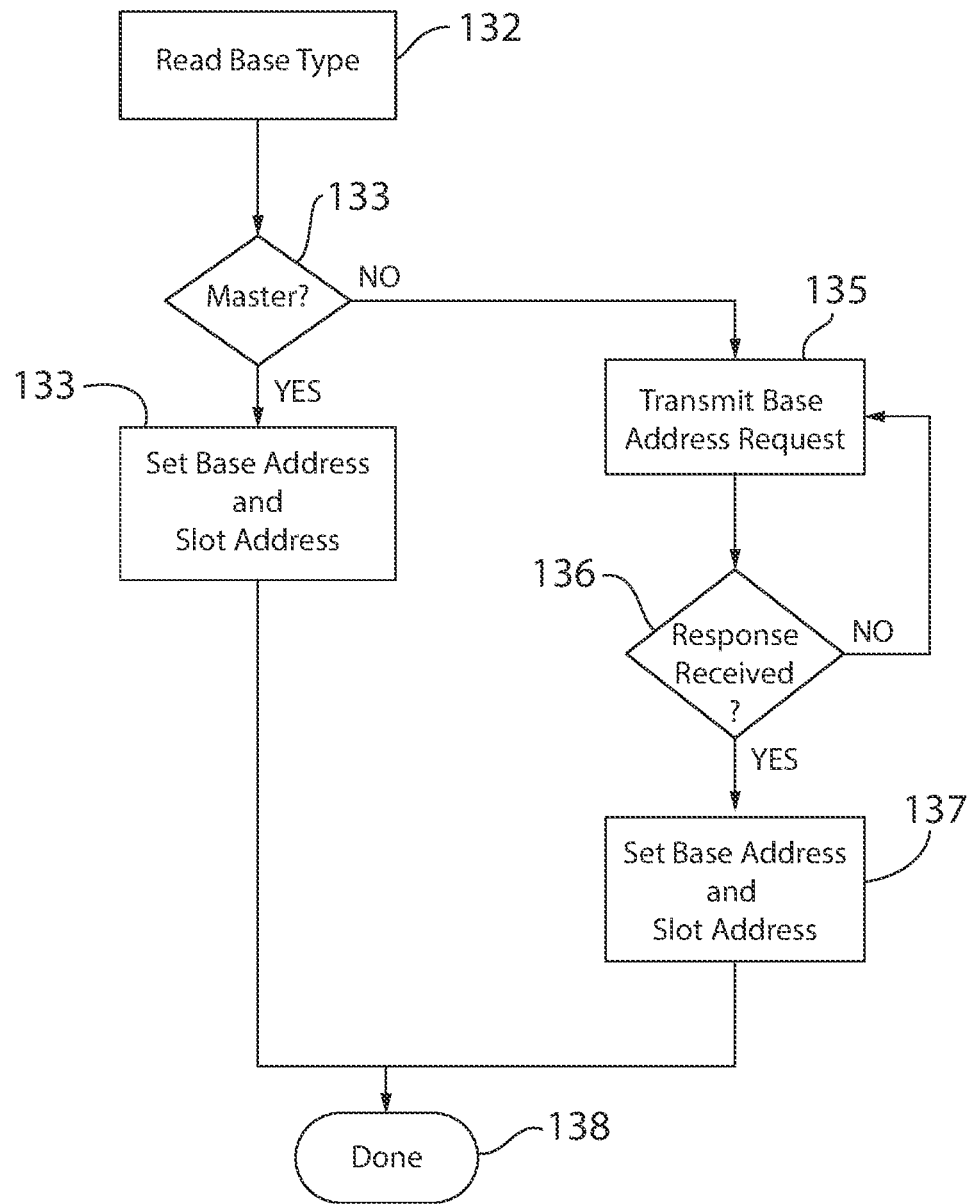
FIG. 6 is a flow diagram illustrating steps for assigning the base addresses as shown in FIG. 5 according to one embodiment of the invention.

Turning next to FIGS. 5 and 6, steps for assigning base and slot addresses are illustrated. The backplane switches 50 manage assignment of both the base address and the slot addresses. At step 132 of FIG. 6, each backplane switch 50 first reads what type of physical base to which it is mounted. A hardware signal is provided during manufacture of base indicates the base type. In one embodiment of the invention, the hardware signal may be a pull up/down resistor. In another embodiment of the invention, the hardware signal may be a value stored in serial read only memory. According to still another embodiment, the hardware signal may be generated by a simple toggle switch, movable between a first and second position, or a physical jumper connection, which may make or break an electrical connection. The hardware signal is intended to be a binary signal, having two different values, where a first value indicates that the base 22 is a bank master and a second value indicates that the base 22 is not the bank master.

At step 133, each backplane switch 50 first determines whether it is located on a base designated as the bank master or on one of the additional I/O module bases. If a backplane switch 50 is located on the bank master base 22A, base address assignment proceeds to step 134. At step 134, the first switch 50A and the second switch 50B on the bank master 22A, each assigns itself a base address of zero. Additionally, each switch 50 reserves a pair of predefined slot addresses for the two slots located on the bank master base 22A. According to one embodiment of the invention, the first bank master module 30A may be assigned slot one hundred and the second bank master module 30B may be assigned slot one hundred one. Having assigned itself base address zero and reserved slot addresses of one hundred and one hundred one, each switch 50 on the bank master 22A has completed address assignment for itself and exits the base address assignment process at step 138.

If a backplane switch 50 is located on an additional I/O module base 22B, 22C other than the bank master base 22A, the backplane switch 50 initiates a base address request, as shown in step 135. Each switch 50 requests an address from another switch 50 located on the base one hop away along the backplane 55. As shown in FIG. 5, the first switch 50A on the first additional I/O module base 22B generates and transmits a first base address request message 120A to the first switch 50A on the bank master base 22A. Similarly, the second switch 50B on the first additional I/O module base 22B generates and transmits a second base address request message 121A to the second switch 50B on the bank master base 22A. The first switch 50A on the second additional I/O module base 22C may, in tandem or subsequent to the first switch 50A on the first additional I/O module base 22B generating a base address request, generate and transmit a first base address request message 120B to the first switch 50A on the first additional I/O module base 22B. Similarly, the second switch 50B on the second additional I/O module base 22C generates and transmits a second base address request message 121B to the second switch 50B on the first additional I/O module base 22B. Each base will only respond after it has had its own base address assigned.

Addressing occurs from one end of the bank to the other. In particular, addressing starts with the bank master base 22A and proceeds to adjacent bases 22B, 22C along the bank. According to the illustrated embodiment, therefore, bank addressing proceeds from left-to-right. As indicated above, each switch may generate a base address request message in tandem, but a base that receives a base address request message will only generate a successful response after it has its own address. The bank master base 22A is the only base that sets its own address. As a result, the bank master base 22A can generate a base address response to the first additional I/O module base 22B. As shown in FIG. 5, the first switch 50A on the bank master base 22A generates a first base address response message 125A to the first switch 50A on the first additional I/O module base 22B, and the second switch 50B generates a second base address response message 126A to the second switch 50B on the first additional I/O module base 22B. Both the first base address response message 125A and the second base address response message 126A include the same addressing information. The backplane switches 50 on the bank master base 22A each increments its base address and inserts the resulting address into the base address response message. Because the address of the bank master base 22A is set to zero, each switch, therefore, sets the base address of the first additional I/O module base 22B to one. In addition, the switches 50 on the bank master base 22A each sets the first slot address to zero and inserts zero as the starting slot address for the first additional I/O module base 22B. Thus, both the first switch 50A and the second switch 50B on the bank master base 22A transmit a base address of one and a starting slot address of zero to the respective switches on the first additional I/O module base 22B.

With reference again to FIG. 6, each switch 50 on a base 22 enters a loop between steps 135 and 136 waiting for a base address response message 125, 126 to be sent from the switch 50 on the adjacent base to which it sent a base address request message 120, 121. When it receives the base address response message 125, 126, the switch 50 on a base then sets its own base address and slot addresses, as shown in step 137. As explained earlier the slot addresses are computed from the starting slot address and the number of slots on the base 22. After setting its own addresses, each switch 50 on a base may exit the base address setting step at step 138. If, however, no base address response message 125, 126 is received within a timeout period, the switch 50 on a base transmits a new base address request message 120, 121 to the switch 50 on adjacent base.

Referring again to FIG. 5, the switches 50 on the second additional I/O module base 22C are transmitting base address request messages 120, 121 to the switches 50 on first additional I/O module base 22B. After the switches 50 on the first additional I/O module base 22B have received the address for the first additional I/O module base 22B and the slot starting address for each slot on the first additional I/O module base 22B from the switches 50 on the bank master base 22A, each switch 50 may now generate base address response messages 125, 126 for transmission to the corresponding switch 50 on the second additional I/O module base 22C. The switch 50 on the first additional I/O module base 22B increments the base address assigned to the first additional I/O module base 22B and determines the ending slot address for the first additional I.O module base 22B from the starting slot address and number of slots. Because the first additional I/O module base 22B received a base address assignment of one, each switch 50 generates a new base address of two. The first additional I/O module base 22B includes four slots. As a result, each switch 50 determines the slot ending address will be three. The four slots will have consecutive slot addresses of zero, one, two, and three. The starting slot address for the second additional I/O module base 22C will be four. It is contemplated that a base 22 may have other numbers of slots, such as two, eight, ten, or the like. The switch 50 provides a new slot address that is one greater than the ending slot address in the base 22 on which it is located. Each switch 50A, 50B on the first additional I/O module base 22B transmits a base address of two and a starting slot address of four to the respective switches 50A, 50B on the second additional I/O module base 22C. The process repeats until all bases in a bank have received a base address and the starting slot address for the base.

It is contemplated that an industrial control system may have multiple banks of modules 10. Additionally, each bank 10 may have more than three bases. The illustrated embodiment is exemplary only and is not intended to be limiting. For example, an industrial control system may include a first bank in which the bank master 10 includes a pair of controller modules 30. The controller modules 30 are configured to execute the control program to achieve desired operation of the controlled machine or process. The number of I/O modules required for the control system may exceed the physical space available within one cabinet. Optionally, a second control cabinet may be positioned at a separate location from the control cabinet in which the first bank is mounted. In the alternate embodiments, a pair of adapter modules (not shown) may be included in the first two slots of a second bank. The adapter modules on the second bank translate messages between the industrial network 38 and the backplane 55. The first bank and the second bank may be connected via an industrial network and modules on those banks may communicate with each other through the network and through the backplanes on respective banks. The controller modules 30 in the first bank serve as bank master modules and the adapter modules in the second bank serve as bank master modules. Each bank may assign base and slot addresses in the manner described above with either controller modules or adapter modules serving as the bank master module 30 of the respective bank. While bases and slot addresses may be duplicated between different banks, data being transmitted between banks is first transmitted via the industrial network 38 to arrive at the desired bank. Once data is at a desired bank, it is transmitted via the backplane 55 to the assigned bank and slot of the module to which the data is intended.

Figure 7:
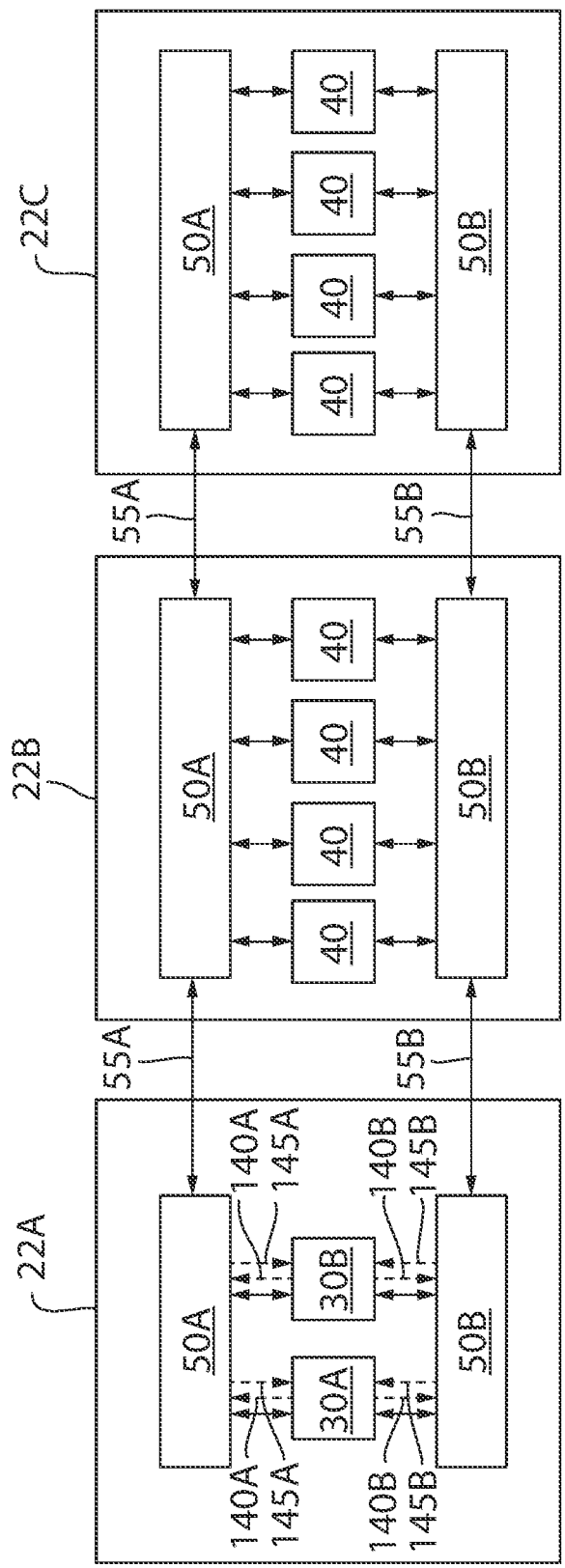
FIG. 7 is a partial block diagram of the exemplary industrial control system shown in FIG. 1 illustrating data flow for validation of slot numbers in a base master.
Figure 8:
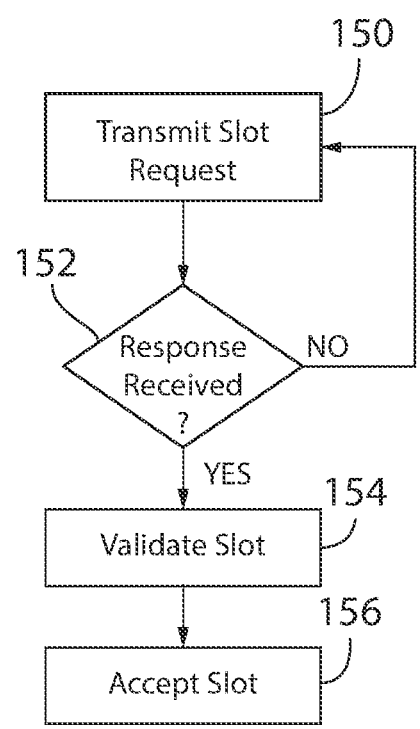
FIG. 8 is a flow diagram illustrating steps for validating slot numbers in a base master module as shown in FIG. 7 according to one embodiment of the invention.

Turning next to FIGS. 7 and 8, the process of assigning slot addresses to modules in each slot of the bank master base is illustrated. Each bank master module 30 in the bank master base 22A generates a slot address request message 140 and transmits the slot address request message to each switch 50 as shown in step 150. According to the illustrated embodiment, the first bank master module 30A generates a first slot address request message 140A and transmits the first slot address request message 140A to the first switch 50A in the bank master base 22A. The first bank master module 30A generates a second slot address request message 140B and transmits the second slot address request message 140B to the second switch 50B in the bank master base 22A. Similarly, the second bank master module 30B generates a first slot address request message 140A and transmits the first slot address request message 140A to the first switch 50A in the bank master base 22A. The second bank master module 30B also generates a second slot address request message 140B and transmits the second slot address request message 140B to the second switch 50B in the bank master base 22A.

Each switch 50A, 50B in the bank master base 22A recognizes that it is on the bank master base according to the hardware signal from the base and responds differently to a slot address request message from a module on the bank master base than the switch would respond to a module located on one of the additional I/O module bases 22B, 22C. When one of the switches 50A, 50B is located on the bank master base 22A and receives a slot address request message 140 from the bank master modules 30A, 30B, each switch 50A, 50B is configured to append the slot address corresponding to the respective bank master module to the slot address request message 140, to generate a new checksum, such as a Cyclic Redundancy Check (CRC) checksum, and to append the new checksum to the slot address request message 140. As previously indicated, the bank master base 22A assigns a predefined slot address to each of its own slots. According to the exemplary embodiment discussed herein, the first bank master module 30A has been assigned slot one hundred and the second bank master module 30B has been assigned slot one hundred one. Each of these values are appended to the corresponding slot address request message 140. The microprocessor (not shown) on switch 50 receives the slot address request message containing appended slot address and generates a slot address response message 145. Each switch 50 then transmits the slot address response message 145 back to the bank master module 30. According to the illustrated embodiment, the first switch 50A generates a first slot address response message 145A and transmits the first slot address response message to the first bank master module 30A in response to the first slot address request message 140A received from the first bank master module 30A. The first switch 50A also generates a first slot address response message 145A and transmits the first slot address response message to the second bank master module 30B in response to the first slot address request message 140A received from the second bank master module 30B. Similarly, the second switch 50B generates a second slot address response message 145B and transmits the second slot address response message to the first bank master module 30A in response to the second slot address request message 140B received from the first bank master module 30A. The second switch 50B also generates a second slot address response message 145B and transmits the second slot address response message to the second bank master module 30B in response to the second slot address request message 140B received from the second bank master module 30B.

Referring to FIG. 8, each bank master module 30 waits at step 152 for a slot address response message 145. If a response is not received within a timeout period, the bank master module 30 returns to step 150 and resends a new slot address request message. When the bank master module 30 receives the slot address response message, the bank master module moves on to steps 154 and 156 to validate and accept the slot address. Validation of the slot address includes comparing the value of the slot address received from each switch 50A, 50B. The first bank master module 30A, therefore, extracts the slot address from the first slot address response message 145A received from the first switch 50A and extracts the slot address from the second slot address response message 145B received from the second switch 50B. According to the exemplary embodiment discussed herein, the slot address in both response messages should be one hundred. Similarly, the second bank master module 30B extracts the slot address from the first slot address response message 145A received from the first switch 50A and extracts the slot address from the second slot address response message 145B received from the second switch 50B. According to the exemplary embodiment discussed herein, the slot address in both response messages should be one hundred one. If the slot address received from both switches matches, the bank master module 30 validates and accepts the slot address. If the slot address received from both switches does not match, the bank master module 30 will not accept the slot address and will enter a fault state indicating an error with the slot assignment process on the bank master base 22A.

Figure 9:
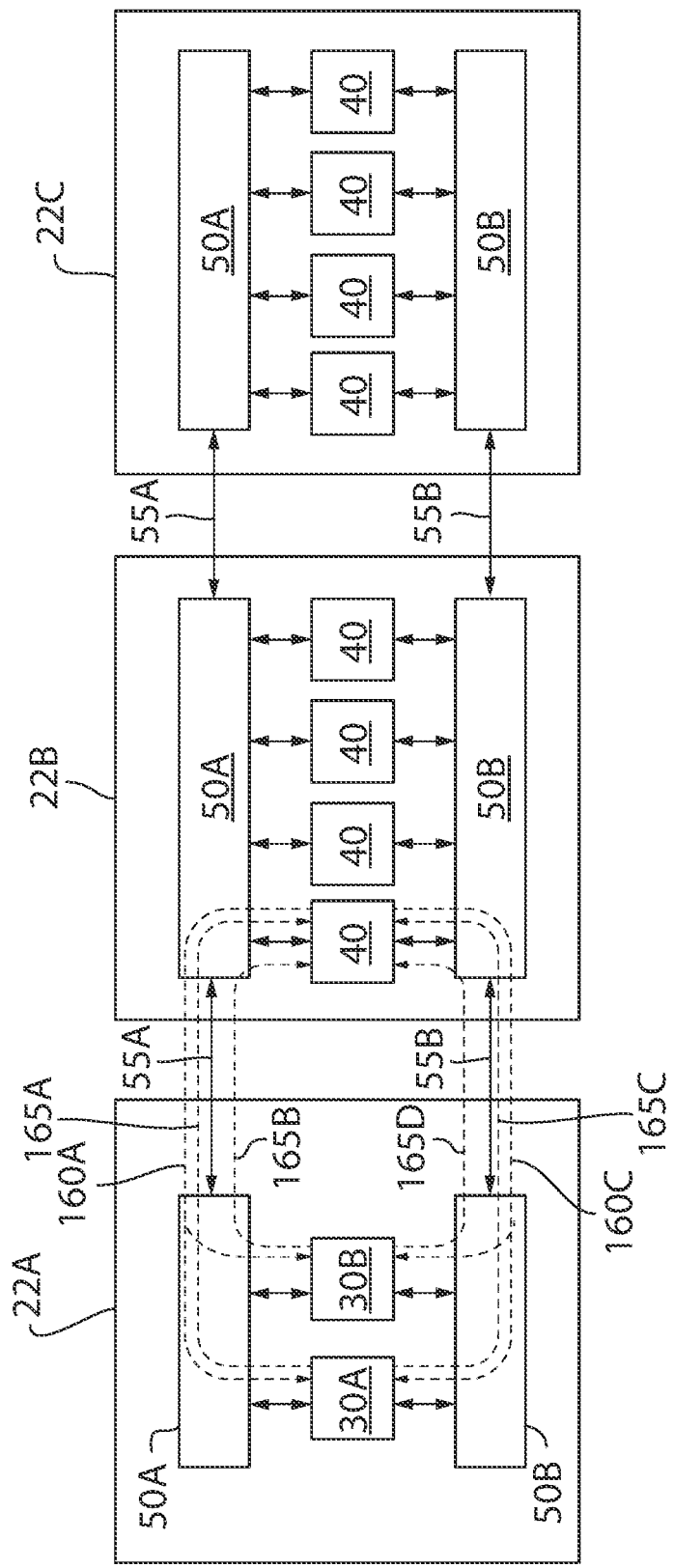
FIG. 9 is a partial block diagram of the exemplary industrial control system shown in FIG. 1 illustrating data flow for validation of slot numbers in I/O modules.
Figure 10:
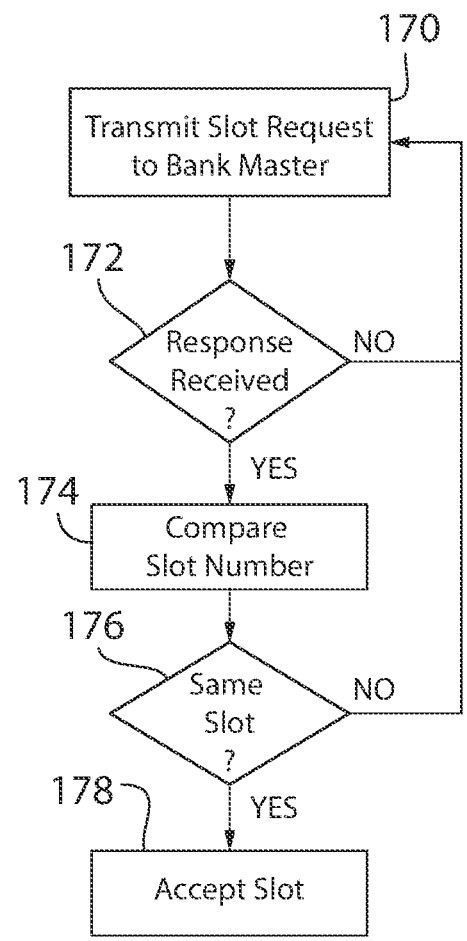
FIG. 10 is a flow diagram illustrating steps for validating slot numbers in I/O modules as shown in FIG. 9 according to one embodiment of the invention.

Turning next to FIGS. 9 and 10, the process of assigning slot addresses to modules 40 in each slot of the additional I/O module bases 22B, 22C is illustrated. Each module 40 in the additional I/O module bases 22B, 22C generates a slot address request message 160 and transmits the slot address request to each bank master module 30 as shown in step 170. For ease of illustration, slot address request messages 160 and slot address response messages 165 are shown from just the first module 40 located on the first additional I/O module base 22B. However, each module 40 on each of the additional I/O module bases 22B, 22C generates a similar set of slot address request messages 160 and the bank master modules 30 generate slot address response messages 165 to each module 40. According to the illustrated embodiment, the I/O module 40 generates a first slot address request message 160A. The first slot address request message 160A is a multicast message and is transmitted to the first bank master module 30A and to the second bank master module 30B in the bank master base 22A via the first backplane 55A. The I/O module 40 generates a second slot address request 160C, which is also a multicast message. The I/O module 40 transmits the second slot address request 160C to the first bank master module 30A and to the second bank master module 30B in the bank master base 22A via the second backplane 55B.

The I/O module 40 is at this point unaware of the physical address for each of the controllers 30. As a result and as indicated above, each slot address request 160 generated by the I/O module 40 will be a multicast message. Multicast messages use a predefined address, where any module can be configured to monitor the predefined address for messages transmitted to that address. Therefore, the I/O module 40 may be configured to generate the first and second slot address requests 160A, 160C to be sent to a multicast address. Each bank master module 30 may be configured to monitor the same multicast address to receive the slot address request messages 160. Both bank master modules 30 will return slot address responses 165 via both backplanes 55 such that the I/O module 40 receives four slot address responses.

As each slot address request message 160 is transmitted from the I/O module 40 to the bank master module 30 it is transmitted via a switch 50 on the additional I/O module base 22B and another switch 50 on the bank master base 22A. Each switch 50A, 50B on the additional I/O module base 22B recognizes the slot address request message 160 as originating from an I/O module 40 on that base 22B. Each slot is connected to the switch 50 via a dedicated port and each switch 50 is further able to identify from which slot on the additional I/O module base 22B the slot address request message 160 is received. The switch 50 appends the slot address, as previously determined in the prior slot address assignment step, to the slot address request message 160 and generates a new checksum, such as a CRC checksum and appends the new checksum to the slot address request message 160 before transmitting the request to the bank master module 30. If, for example, a switch 50 on the first additional I/O module base 22B receives a slot address request message generated by one of the modules 40 on the second additional I/O module base 22C, the switch 50 recognizes that the message was received via the backplane connection between bases and not directly from one of the slots on the first additional I/O module base 22B. The switches 50 do not modify a slot address request message 160 received from another base 22 but rather simply transfer the slot address request message along the backplane 55 to the bank master modules 30.

For each slot address request message 160 received at the bank master module 30, the bank master module 30 will append receive port information to the slot address request message 160 and generate a new checksum for the message. The receive port information will identify whether the slot address request message 160 is received via the first backplane 55A or via the second backplane 55B. The microprocessor (not shown) on bank master modules 30, therefore, receive the original slot address request message 160, an appended slot address identifying which slot sent the request, and receive port information identifying from which backplane the message was received. Because the slot address request message 160 was transmit as a multicast message, the original message includes the physical address of the I/O module 40 which sent the message. Each bank master module 30 will extract the slot address and the physical address from the slot address request message 160 and create a table containing the slot address and the corresponding physical address of each module in the corresponding bank of modules 10. One of the two slot request messages 160 from each backplane 55 will be received by the controller first. When the initial slot request message is received, there will be no entry in the slot address table for the I/O module 40. The bank master module 30 records the slot address and the physical address for the corresponding slot address in the table. Each bank master module 30 will also receive a duplicate slot address request message 160 from the other backplane 55. When the duplicate slot address request message 160 is received, the bank master module 30 compares the slot address and the corresponding physical address for the slot address to the value entered in the table. If the information matches, the bank master module 30 generates a successful slot address response message 165 message. If the information does not match, the bank master module 30 will generate a slot address response 165 with an error message. Because the bank master module 30 has the physical address of the requesting slot, the bank master module transmits the slot address response message 165 as a unicast message to the I/O module 40 via the backplane 55 by which it received the request.

Referring to FIG. 10, each I/O module 40 waits at step 172 for a slot address response message. If a response is not received within a timeout period, the I/O module 40 returns to step 170 and resends a new slot address request message. When the I/O module 40 receives the slot address response message, the I/O module moves on to steps 174 to 178 to validate and accept the slot address. Validation of the slot address includes an initial step of comparing the value of the slot address received from each bank master module 30 as shown in step 174. If the slot address request process is successful, each I/O module 40 should receive four separate slot address response messages 165. The I/O module 40 receives a first slot address response message 165A from the first bank master module 30A in the bank master base 22A via the first backplane 55A. The I/O module 40 receives a second slot address response message 165B from the second bank master module 30B in the bank master base 22A via the first backplane 55A. The I/O module 40 receives a third slot address response message 165C from the first bank master module 30A in the bank master base 22A via the second backplane 55B. The I/O module 40 receives a fourth slot address response message 165D from the second bank master module 30B in the bank master base 22A via the second backplane 55B. If any of the slot address response messages 165 indicate an error occurred, the I/O module 40 may be configured to restart the slot addressing process and resend new slot address request messages 160. The I/O module 40 may also be configured to post a fault message in response to receiving an error response. Optionally, the I/O module 40 may be configured to retry the slot addressing process for a predefined number of attempts before generating a fault message. A successful slot address response message 165 will include the slot address for the I/O module in the response message. The I/O module 40 extracts the slot address from each slot address response message 165 and compares the slot address from each response. As shown at step 176, if any of the slot addresses does not match, the I/O module 40 will restart the slot addressing process. If, however, all of the slot addresses extracted from each slot address response 165 do match, the I/O module 40 accepts the slot number and begins normal operation of receiving inputs from or sending output signals to the controlled devices using the assigned slot address.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for assigning addresses to a plurality of modules in a fault tolerant industrial control system, the method comprising the steps of:
   assigning a master base address to a first base when at least one backplane switch on the first base detects a signal indicating the first base is a master base;
   receiving a base address request at the at least one backplane switch on the first base from at least one backplane switch on at least one additional base;
   transmitting a base address and a slot start address from the at least one backplane switch on the first base to the at least one backplane switch on the at least one additional base responsive to receiving the base address request when the master base address has been assigned to the first base;
   receiving a first slot address request with at least one master module on the master base from a first module on the at least one additional base;
   extracting a physical address and a slot address of the first module from the first slot address request with the at least one master module;
   receiving a second slot address request with the at least one master module on the master base from the first module on the at least one additional base;
   extracting a physical address and a slot address of the first module from the second slot address request with the at least one master module;
   comparing the physical address and the slot address extracted from the first slot address request to the physical address and the slot address extracted from the second slot address request;
   when the physical address and the slot address extracted from the first slot address request matches the physical address and the slot address extracted from the second slot address request:
      transmitting a first slot address response from the at least one master module to the first module on the at least one additional base, the first slot address response identifying a successful slot address request, and
      transmitting a second slot address response from the at least one master module to the first module on the at least one additional base, the second slot address response identifying the successful slot address request; and
   when either the physical address or the slot address extracted from the first slot address request fails to match the physical address or the slot address extracted from the second slot address request:
      transmitting a first slot address response with an error response from the at least one master module to the first module on the at least one additional base, and
      transmitting a second slot address response with the error response from the at least one master module to the first module on the at least one additional base.

2. The method of claim 1, further comprising the step of authenticating a connection on at least one backplane between the at least one backplane switch on the first base and the at least one backplane switch on the at least one additional base, wherein:
   the at least one backplane includes a first backplane and a second backplane,
   the first base includes a first backplane switch and a second backplane switch,
   the at least one additional base includes a first backplane switch and a second backplane switch,
   the first backplane is operatively connected between the first backplane switch on the first base and the first backplane switch on the at least one additional base,
   the second backplane is operatively connected between the second backplane switch on the first base and the second backplane switch on the at least one additional base,
   the step of authenticating the connection on the at least one backplane between the at least one backplane switch on the first base and the at least one backplane switch on the at least one additional base further includes the steps of:
   authenticating a first connection on the first backplane between the first backplane switch on the first base and the first backplane switch on the at least one additional base, and
   authenticating a second connection on the second backplane between the second backplane switch on the first base and the second backplane switch on the at least one additional base.

3. The method of claim 2 wherein the step of authenticating the first connection on the first backplane between the first backplane switch on the first base and the first backplane switch on the at least one additional base further comprises the steps of:

generating a first random number in the first backplane switch on the first base,
transmitting the first random number and a first vendor certificate from the first backplane switch on the first base to the first backplane switch on the at least one additional base,
generating a second random number in the first backplane switch on the at least one additional base, and
transmitting the second random number and a second vendor certificate from the first backplane switch on the at least one additional base to the first backplane switch on the first base; and
wherein the step of authenticating the second connection on the second backplane between the second backplane switch on the first base and the second backplane switch on the at least one additional base further comprises the steps of:
generating a third random number in the second backplane switch on the first base,
transmitting the third random number and a third vendor certificate from the second backplane switch on the first base to the second backplane switch on the at least one additional base,
generating a fourth random number in the second backplane switch on the at least one additional base, and
transmitting the fourth random number and a fourth vendor certificate from the second backplane switch on the at least one additional base to the second backplane switch on the first base.

4. The method of claim 3 wherein the step of authenticating the first connection on the first backplane between the first backplane switch on the first base and the first backplane switch on the at least one additional base further comprises the steps of:
signing the second random number in the first backplane switch on the first base,
transmitting the signed second random number from the first backplane switch on the first base to the first backplane switch on the at least one additional base,
signing the first random number in the first backplane switch on the at least one additional base, and
transmitting the signed first random number from the first backplane switch on the at least one additional base to the first backplane switch on the first base; and
wherein the step of authenticating the second connection on the second backplane between the second backplane switch on the first base and the second backplane switch on the at least one additional base further comprises the steps of:
signing the fourth random number in the second backplane switch on the first base,
transmitting the signed fourth random number from the second backplane switch on the first base to the second backplane switch on the at least one additional base,
signing the third random number in the second backplane switch on the at least one additional base, and
transmitting the signed third random number from the second backplane switch on the at least one additional base to the second backplane switch on the first base.

5. The method of claim 2 wherein the step of receiving the base address request at the at least one backplane switch on the first base from the at least one backplane switch on the at least one additional base further comprises the steps of:
receiving a first base address request at the first backplane switch on the first base from the first backplane switch on the at least one additional base, and
receiving a second base address request at the second backplane switch on the first base from the second backplane switch on the at least one additional base; and
wherein the step of transmitting the base address and the slot start address from the at least one backplane switch on the first base to the at least one backplane switch on the at least one additional base further comprises the steps of:
transmitting the base address and the slot start address from the first backplane switch on the first base to the first backplane switch on the at least one additional base in a first base address response, and
transmitting the base address and the slot start address from the second backplane switch on the first base to the second backplane switch on the at least one additional base in a second base address response.

6. The method of claim 1 wherein the fault tolerant industrial control system includes one first base and a plurality of additional bases, the method further comprises the steps of:
authenticating a connection on at least one backplane between the at least one backplane switch on one of the plurality of additional bases and the at least one backplane switch on another of the plurality of additional bases located one hop apart, wherein authentication of each of the connections occurs in parallel.

7. An industrial control system configured to assign addresses to a plurality of slots, the industrial control system comprising:
a master base including a first backplane and a second backplane;
a first master backplane switch mounted to the master base and configured to communicate on the first backplane;
a second master backplane switch mounted to the master base and configured to communicate on the second backplane;
a first master module mounted in a first slot on the master base, the first master module in communication with the first master backplane switch and with the second master backplane switch;
a second master module mounted in a second slot on the master base, the second master module in communication with the first master backplane switch and with the second master backplane switch;
at least one additional base including a first backplane and a second backplane, wherein the first backplane in the at least one additional base is configured to communicate with the first backplane in the master base and the second backplane in the at least one additional base is configured to communicate with the second backplane in the master base;
at least one additional first backplane switch, each of the at least one additional first backplane switches is mounted to one of the at least one additional bases and is configured to communicate on the first backplane of the corresponding additional base;
at least one additional second backplane switch, each of the at least one additional second backplane switches is mounted to one of the at least one additional bases and is configured to communicate on the second backplane of the corresponding additional base; and
a plurality of additional modules, each of the plurality of additional modules is mounted in a slot on one of the at least one additional bases, wherein:

each of the plurality of additional modules is in communication with the additional first backplane switch and the additional second backplane switch on the corresponding additional base, the first master backplane switch transmits a base address and a slot start address to the at least one additional first backplane switch connected one hop apart, the second master backplane switch transmits the base address and the slot start address to the at least one additional second backplane switch connected one hop apart, the first and the second master modules are each configured to receive a first and a second slot address request from each of the plurality of additional modules, the first and the second master modules are each configured to compare a physical address and a slot address present in each of the first and the second slot address requests for each of the plurality of additional modules;

when the physical address and the slot address from the first and the second slot address requests from one of the plurality of additional modules match, the first and the second master modules are each configured to transmit a slot address response identifying a successful slot address request to the physical address identified from the first and the second slot address requests; and when either the physical address or the slot address from the first and the second slot address requests from one of the plurality of additional modules fails to match, the first and the second master modules are each configured to transmit the slot address response identifying an error in the slot address request to the physical address identified from the first and the second slot address requests.

8. The industrial control system of claim 7 wherein:

the first master backplane switch and the at least one additional first backplane switch connected one hop apart are configured to authenticate a connection between the first master backplane switch and the at least one additional first backplane switch;

the second master backplane switch and the at least one additional second backplane switch connected one hop apart are configured to authenticate a connection between the second master backplane switch and the at least one additional second backplane switch;

the first master backplane switch is further configured to generate a first random number and to transmit the first random number and a first vendor certificate to the at least one additional first backplane switch;

the at least one additional first backplane switch is further configured to generate a second random number and to transmit the second random number and a second vendor certificate to the first master backplane switch;

the second master backplane switch is further configured to generate a third random number and to transmit the third random number and the first vendor certificate to the at least one additional second backplane switch; and the at least one additional second backplane switch is configured to generate a fourth random number and to transmit the fourth random number and the second vendor certificate to the second master backplane switch.

9. The industrial control system of claim 8 wherein:

the first master backplane switch is further configured to sign the second random number and to transmit the signed second random number to the at least one additional first backplane switch;

the at least one additional first backplane switch is further configured to sign the first random number and to transmit the signed first random number to the first master backplane switch;

the second master backplane switch is further configured to sign the fourth random number and to transmit the signed fourth random number to the at least one additional second backplane switch; and the at least one additional second backplane switch is further configured to sign the third random number and to transmit the signed third random number to the second master backplane switch.

10. The industrial control system of claim 7 wherein:

the first master backplane switch is configured to receive a first base address request from the at least one additional first backplane switch connected one hop apart;

the first master backplane switch is configured to transmit the base address and the slot start address to the at least one additional first backplane switch connected one hop apart in a first base address response;

the second master backplane switch is configured to receive a second base address request from the at least one additional second backplane switch connected one hop apart; and the second master backplane switch is configured to transmit the base address and the slot start address to the at least one additional second backplane switch connected one hop apart in a second base address response.

11. The industrial control system of claim 7 wherein:

the first master module is configured to transmit a first slot address request to the first master backplane switch;

the first master module is configured to transmit a second slot address request to the second master backplane switch;

the second master module is configured to transmit a third slot address request to the first master backplane switch;

the second master module is configured to transmit a fourth slot address request to the second master backplane switch;

the first master backplane switch detects a signal defining the master base as the master base;

the first master backplane switch transmits a first master slot address to the first master module in response to the first slot address request;

the first master backplane switch transmits a second master slot address to the second master module in response to the third slot address request;

the second master backplane switch detects the signal defining the master base as the master base;

the second master backplane switch transmits the first master slot address to the first master module in response to the second slot address request; and the second master backplane switch transmits the second master slot address to the second master module in response to the fourth slot address request.

12. The industrial control system of claim 7 wherein:

the first master module receives the first slot address request from each of the plurality of additional modules via the first backplane;

the first master module transmits a first slot address response to the additional module from which the first slot address request was received via the first backplane;

the first master module receives the second slot address request from each of the plurality of additional modules via the second backplane;

the first master module transmits a second slot address response to the additional module from which the second slot address request was received via the second backplane;

the second master module receives the first slot address request from each of the plurality of additional modules via the first backplane;

the second master module transmits a third slot address response to the additional module from which the third slot address request was received via the first backplane;

the second master module receives the second slot address request from each of the plurality of additional modules via the second backplane; and the second master module transmits a fourth slot address response to the additional module from which the fourth slot address request was received via the second backplane.

13. The industrial control system of claim 12 wherein the additional module is further configured to assign itself the slot address when the slot address received from the first slot address response, the second slot address response, the third slot address response, and the fourth slot address response match.

14. The industrial control system of claim 7 further comprising:
a plurality of additional bases, each additional base including the first backplane and the second backplane;
a plurality of additional first backplane switches, wherein each of the additional first backplane switches is mounted to one of the plurality of additional bases and is configured to communicate on the first backplane of the corresponding additional base; and
a plurality of additional second backplane switches, wherein each of the additional second backplane switches is mounted to one of the plurality of additional bases and is configured to communicate on the second backplane of the corresponding additional base.

15. The industrial control system of claim 14 wherein:
each of the plurality of additional first backplane switches is configured to authenticate a connection between another of the additional first backplane switches connected one hop apart;
each of the plurality of additional second backplane switches is configured to authenticate a connection between another of the additional second backplane switches connected one hop apart, wherein authentication of each connection occurs in parallel.

16. A method for assigning addresses to a plurality of modules in a fault tolerant industrial control system, the method comprising the steps of:
assigning a master base address to a first base when at least one backplane switch on the first base detects a signal indicating the first base is a master base;
receiving a base address request at the at least one backplane switch on the first base from at least one backplane switch on at least one additional base;
transmitting a base address and a slot start address from the at least one backplane switch on the first base to the at least one backplane switch on the at least one additional base responsive to receiving the base address request when the master base address has been assigned to the first base;
receiving a first slot address request from a first module on the at least one additional base with at least one master module on the master base;
extracting a physical address and a slot address of the first module from the first slot address request with the at least one master module;
receiving a second slot address request from the first module on the at least one additional base with the at least one master module on the master base;
extracting a physical address and a slot address of the first module from the second slot address request with the at least one master module;
comparing the physical address and the slot address extracted from the first slot address request to the physical address and the slot address extracted from the second slot address request;
when the physical address and the slot address extracted from the first slot address request matches the physical address and the slot address extracted from the second slot address request:
transmitting a first slot address response identifying a successful slot address request to the first module on the at least one additional base from the at least one master module; and
transmitting a second slot address response identifying the successful slot address request to the first module on the at least one additional base from the at least one master module, and
when either the physical address or the slot address extracted from the first slot address request fails to match the physical address or the slot address extracted from the second slot address request:
transmitting a first slot address response with an error response to the first module on the at least one additional base from the at least one master module, and
transmitting a second slot address response with the error response to the first module on the at least one additional base from the at least one master module.

17. The method of claim 16, further comprising the steps of:
authenticating a connection between the at least one master module and the at least one backplane switch present on the first base; and
authenticating a connection between the first module and the at least one backplane switch present on the at least one additional base.

18. The method of claim 1, further comprising the step of recording the physical address and the slot address of the first module extracted from the first slot address request in a slot address table.

19. The method of claim 18, wherein the step of comparing the physical address and the slot address extracted from the first slot address request to the physical address and the slot address extracted from the second slot address request comprises comparing the physical address and the slot address extracted from the second slot address to the physical address and the slot address recorded in the slot address table.

* * * * *